United States Patent Office 3,378,676
Patented Apr. 16, 1968

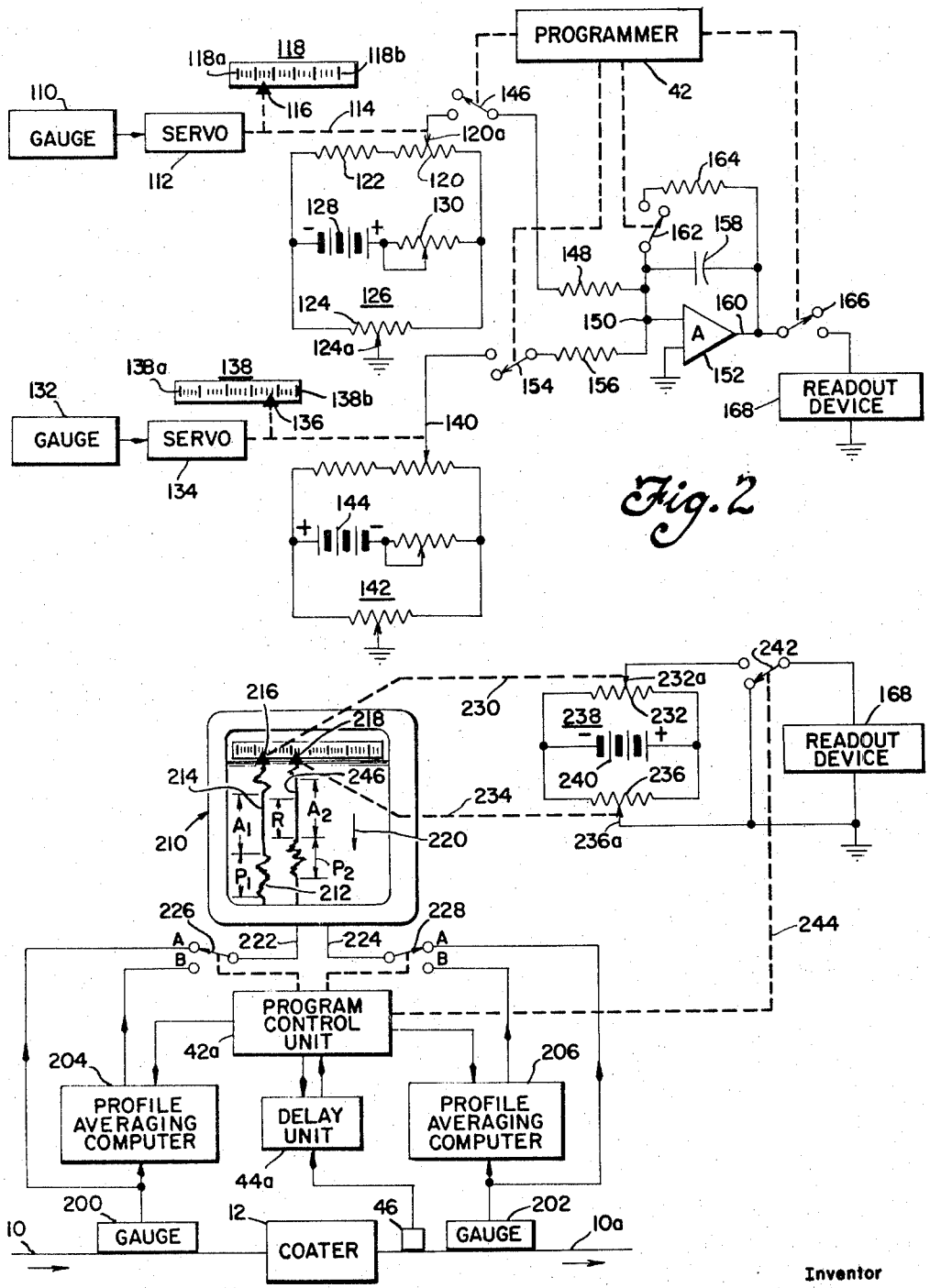

3,378,676
SYSTEM EMPLOYING PLURAL TIME-SPACED AVERAGE COMPUTATIONS FOR MEASURING A SECOND VARIABLE CHARACTERISTIC IMPARTED TO A MATERIAL INITIALLY HAVING A FIRST VARIABLE CHARACTERISTIC
John C. Clement, Devon, Pa., assignor to Industrial Nucleonics Corporation, a corporation of Ohio
Filed July 16, 1963, Ser. No. 295,337
13 Claims. (Cl. 235—151.3)

This invention relates to a system employing a plurality of gauges and a computer for providing differential measurements of a continuously formed product such as a laminar material comprising a base sheet or strip to which a coating is applied, and more particularly it relates to a system for delay-synchronizing and mathematically combining measurement derived from gauges spaced along the path of travel of said product during the formation thereof.

Many industrial processes, such as coating, laminating or plating processes, have characteristics such that no suitable measurement can be made of a coating material per se after the coating has been applied. Hence it is customary to provide a first gauging means to measure the thickness of the base sheet before the coating is applied, and to provide a second gauging means for measuring the thickness or other charteristic of the sheet after the coating is applied. Signals derived from the two gauges are then combined mathematically by a device which subtracts the measurement of the base sheet thickness from the measurement of the total thickness constituting the base sheet plus the coating applied thereto. This arrangement is described basically in Allen Patent No. 1,895,118.

However, a difficulty arises in applying this differential measurement technique because of the fact that the base sheet is subject to variations from point to point along the length thereof in the machine direction wherein the material passes through the coating machine. After a given portion of the base sheet is measured by the first gauge, it requires a definite and sometimes rather substantial period of time for this portion of material to be transported through the coating machine to the location of the second gauge whereby the total thickness of the base sheet plus the coating is obtained. Thus any given point in time the analog signals obtained from the two gauges represent measurements taken on different portions of the base sheet. If the two gauge signals are applied to a subtraction circuit in order to derive a signal representing the coating measurement per se, the computed measurement is subject to error due to the fact that different portions of the base sheet are undergoing measurement, and due to the fact that the weight of the base sheet is subject to changes in the machine direction during the transportation delay period which obtains between the time the base sheet is initially measured and the time that the coated sheet is measured.

In order to overcome this difficulty, and to insure that the two signals fed into the computer at any given instant both represent measurements involving the same portion of the base sheet, various proposals have been made whereby the signal derived from the gauge measuring the base sheet is delayed in time for the length of the interval required for the material to travel from the location of the first gauge, through the coating apparatus, and to the location of the second gauge. These proposals are exemplified by the Hags Patent No. 2,793,345, which suggests that the analog signal provided by the gauge measuring the uncoated base strip be recorded on a medium such as a magnetic recording disc. The recording disc is driven in synchronism with the transport mechanism for the sheet passing through the process, so that the recorded signal is delayed for the period of time required for a point on the recording disc to move from the recording head to the pick-up head whereby the recorded signal is reproduced. By virtue of the synchronous drive, the transportation delay of the moving disc is equal to the transportation delay of the moving sheet undergoing measurement. The recorded signal is then combined in the subtraction computer with the signal derived from the second gauge representing the measurements of the coated strip.

While this technique is sound in principle, many serious problems are encountered in adapting the principle to the design of a practical industrial measuring system. It is now well known that it is impractical to make accurate analog recordings on a magnetic medium by converting, say, a variable analog voltage to a correspondingly varying magnetic flux density in the medium, because of the fact that magnetic materials exhibit hysteresis and their characteristics change with temperature and variations in the magnetic medium from point to point thereon. To my knowledge, the only satisfactory method of recording analog signal levels on a magnetic medium is to first convert the analog signal to a variable pulse frequency applied to the recording transducer and at a later time to convert the variable-frequency signal picked up the reproducing transducer back to an analog voltage. This provides a fairly satisfactory delay device where the magnetic medium can be driven at a constant speed. However, in the case where the speed of the magnetic medium must be variable as in the present case, where the time delay and therefore the speed of the magnetic medium has to be variable in accordance with the process speed, it is apparent that the analog signal, which is stored in the form of a frequency variation, is modulated and rendered erroneous according to the variations in the speed of the magnetic medium.

Various ingenious mechanical or electromechanical analog delay devices have also been proposed. For example, reference can be made to Dexter Patent No. 2,819,369 and the Broerman Patent No. 2,980,126. However, in general these mechanical or electromechanical analog delay systems are not sufficiently accurate for the particular purposes at hand because they suffer from nonlinearities and are subject to wear.

Undoubtedly systems could be constructed using magnetic drum or tape delay devices wherein signals are stored in digital form using multiple-digit, parallel binary codes. In general, however, these digital devices are not directly compatible with the analog gauging and controlling devices presently employed to control industrial processes of the type to which the present invention is applicable, and accordingly it appears that the cost of the system design and the cost of producing such a system would be prohibitive to the economics of the processes involved. While I am intimately familiar with a substantial cross-section of representative sheet processing industries, to my knowledge no successful application of the delay techniques to the measurement and control of sheet coating processes has ever been achieved.

In accordance with this invention, I have taken a different approach to the problem of delay synchronization and have provided an apparatus which avoids the foregoing and other difficulties of prior art proposals while retaining most of their theoretical advantages. This novel apparatus comprises means for computing the average, or more specifically the time integral, of the signal derived from each of the two gauges. The signal derived from the first gauge, meausing the uncoated base sheet, is integrated for a time period sufficient to average out the time variations in, say, the thickness of the base sheet in the machine direction. The signal derived from the second gauge measuring the coated sheet is also integrated for a substantially equal interval. Assuming that the computation of the first integral is started at a given instant, the beginning of the second integration is delayed for a time interval sufficient to allow the sheet to travel from the location of the first gauging instrument, through the coating machine, to the location of the second gauge. The signal representing the integrated average measurement of the base sheet is stored in the first integrator until the integrating interval for the measurements of the coated sheet has been computed.

At this time the signals representing the two integrated averages are delivered to a difference computer, which subtracts the computed average measurement of the base sheet from the computed average measurement of the coated sheet. The output of the difference computer then represents the integrated average thickness value of the coating which has been applied to the base sheet, and this signal may be recorded and/or delivered to a suitable automatic control device for automatically adjusting the coating machine.

In order that the coated sheet average measurements will be related to the same portion of the base sheet as the uncoated sheet average measurements in spite of variations in the speed of the process line, I arrange for the time delay between the beginning of the two integration intervals to be variable in accordance with the line speed. To this end, I provide an odometer type device, which may comprise a measuring wheel in tractive engagement with the sheet, for generating an electrical pulse each time a short, predetermined length of material has passed under the measuring wheel. The pulses are delivered to a counter device which accumulates a predetermined count correslated with the length of travel of the sheet between the two gauges. The counter mechanism is energized at the beginning of the base sheet integration interval, and causes the coated sheet integration interval to begin when the predetermined count has been accumulated.

The systems hereinabove described contemplate measurement and control of variations which occur in the machine direction only. An extension of the concept of the present invention, and perhaps its most important application, relates to the measurement and control of sheets having substantial width, and is concerned with the measurement of variations across the profile of the sheet as well as variations in the machine direction.

Further in accordance with the present invention, and in the preferred embodiments of the invention to be described in detail hereinafter, I provide a pair of scanning gauges including gauging heads adapted to traverse back and forth across the traveling sheet, to-and-fro across the width thereof. Basically this is a conventional and well-known arrangement, and for a description of details which it is unnecessary and inappropriate to describe at length herein, reference can be made for example to prior patents such as Hays et al. 3,015,129, Hickman et al. 3,007,052, Hickman 3,065,466 and additional references listed therein. As appears from the disclosure of these references and as is common knowledge in the industry, in the measurement of sheet coating processes it is customary to provide a pair of scanning gauges for the coated and uncoated sections of the sheet, said gauges being programmed to traverse back and fourth across the width of the sheet in synchronism. Each of the gauges is equipped with an integrating device referred to as a profile averaging computer, whose switching operations are controlled by a programmed switching device which controls the scanning movement of the gauges so that each integrator generates a signal representing the average of the measurement may by its associated gauging device while the gauging head is traversing across the width of the sheet.

In accordance with this invention, I modify the prior art arrangement so that the two gauging heads no longer scan the sheet in synchronism, by incorporating the variable delay device hereinabove described which delays the start of the scanning movements of the second gauge measuring the coated sheet for the length of time required for the material to travel from the location of the first gauge to the location of the second gauge. With the proper amount of delay determined by the line speed of the sheet in the machine direction, and provided that the two gauges scan across the width of the sheet at the same speed in relation to the line speed, it is apparent that the same portions of the material will be inspected by both gauges, and that both of the averaging computers will average out the short-term variations in the material, both in the machine direction and in the profile direction thereof.

Where the present invention is employed with scanning gauges, it has a further important advantage in that it avoids the necessity for the ultra-precision in the design of the traversing motor drive system which would be required with the analog signal delay systems previously proposed. This can be appreciated by considering the fact that where the sheet is travelling at 1,000 feet per minute, if there is an error of one-tenth of a second in the start-up or acceleration of the downstream gauge traversing motor, it will result in a 20-inch error in tracking, and substantial point-to-point variations can occur in the base sheet thickness in this distance. The effect of this error in tracking may be substantially eliminated where an average is taken over, say, several hundred feet of material by the technique of the invention.

It is the principal object of this invention to provide a technically and economically practical industrial system for accurately indicating the amount of a coating applied to a base material, where the coating per se cannot be independently measured.

It is also an object to provide a system for combining measurements made before and after a continuously moving workpiece is altered, without requiring the use of a device capable of recording and thereafter reproducing a continuous analog signal.

It is another object to provide, in a system in accordance with the foregoing objects, a delay-synchronizing system which is directly compatible with existing analog systems for measuring and controlling industrial processes.

It is still another object to provide such a system which renders a measurement independent of short-term and random variations in the base material, the coating, or both.

It is yet another object to provide such a system employing scanning gauges for a wide-sheet product without requiring extremely precise and therefore expensive motor drive systems and controls for traversing the gauges across the sheet.

It is likewise an object to provide such a system utilizing only existing components commonly employed in conventional measuring and controlling apparatus for industrial processes.

It is again an object to provide an arrangement whereby existing systems employing plural gauges and computers for computing coating measurements, whether or not they employ the scanning gauge principle, can be easily modified to incorporate the present invention without requiring major redesign of the system or the addition to the system of a substantial amount of extra equipment and components.

Further objects and advantages of the present invention will become apparent in the following detailed description of certain preferred embodiments of the invention, taken in conjunction with the appended drawings, in which:

FIG. 2 is a sketch, partly schematic and partly a circuit diagram, showing a modification of a part of FIG. 1, wherein a plurality of the functional units of FIG. 1 may be combined in a single circuit.

FIG. 3 is a schematic diagram showing an arrangement whereby an existing commercial measuring apparatus may be modified to provide a measuring system in accordance with the present invention.

Figure 1:
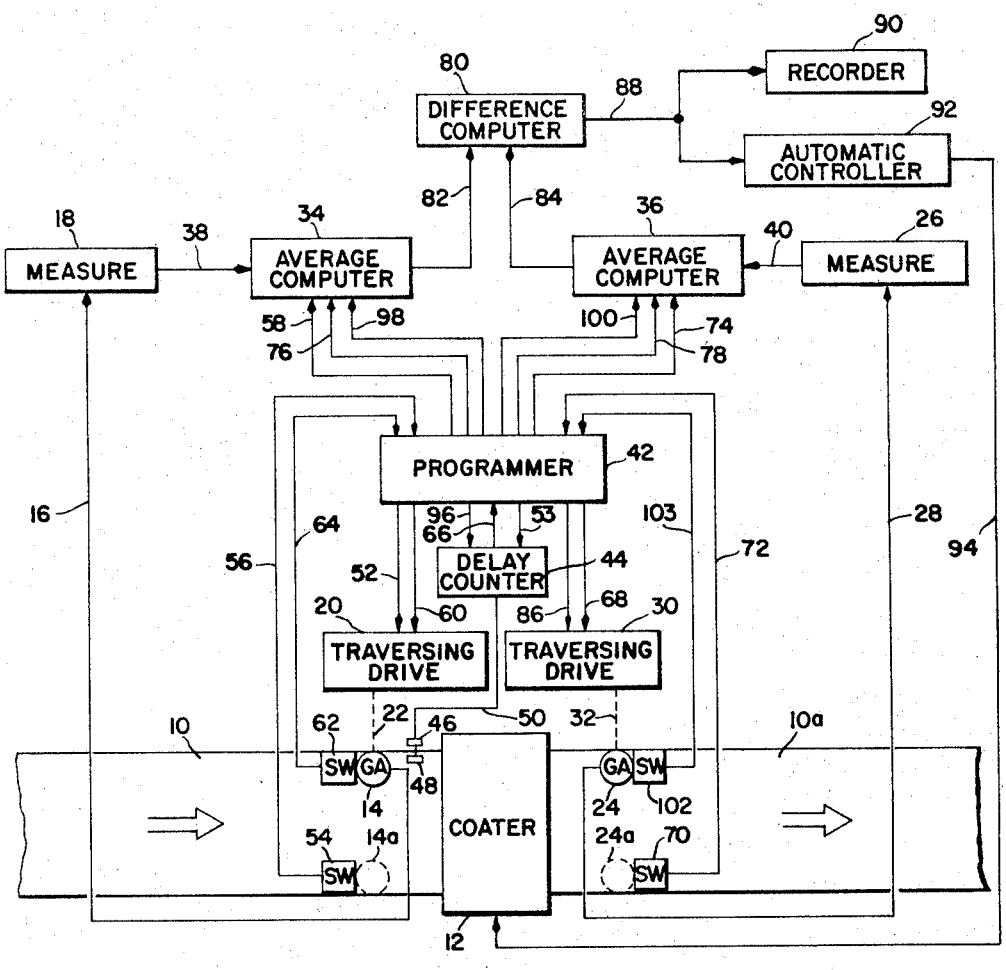
FIG. 1 is a block diagram of an industrial measuring and controlling system in accordance with one form of the invention.

Referring now to FIG. 1, there is shown a plan view of an industrial manufacturing process wherein a traveling base sheet 10, moving to the right in the direction of the arrows, is fed into a coating machine 12, wherefrom it emerges as a coated sheet 10a. Upstream of the coating machine 12 is a gauging head 14, connected as indicated by line 16 to a measuring instrument 18. The gauging head 14 is adapted for traversing movement back and forth across the width of the sheet 10 by a traversing drive mechanism 20 which it is understood includes motor means for providing mechanical power. The connection of the traversing drive mechanism 20 to the gauging head 14 is indicated by the dotted line 22.

Downstream of the coating machine 12 is mounted a second gauging head 24, which is connected to a measuring instrument 26 as indicated by line 28. The gauging head 24 is also adapted to be reciprocated back and forth across the width of the coated sheet 10a by a traversing drive mechanism 30, as is indicated by the dotted line connection 32.

Connected to the measuring devices 18 and 26 respectively are a pair of average computers 34 and 36. The average computer 34 is adapted to receive from its associated measuring circuit 18 a derived signal, via line 38, which is a continuously variable function of the thickness of the base sheet 10 as measured by the gauging head 14. Similarly the average computer 36 receives via line 40 a signal, derived from the measuring system 26, which is a function of the thickness of the coated sheet 10a as measured by the gauging head 24. It is the function of each of the average computers 34 and 36 to compute the time integral of a signal delivered to its input. The two traversing drive mechanism 20 and 30 and the two average computers 34 and 36 are controlled by a programmed switching device 42.

The combination of the gauging head 14, traversing drive system 20, measuring system 18 and averaging computer 34 with a programmed switching device generally similar to that shown at 42 is a conventional and well-known arrangement which is described in detail in the Hays et al. patent cited hereinabove. Gauging head 24, measuring system 26, traversing drive system 30, and average computer 36 constitute substantially a duplication of the measuring system previously described which is located upstream of the coater 12. Further, it is conventional to employ a pair of these scanning gauges and computer systems under the control of a single programmed switching device similar to that indicated at 42 to provide synchronous scanning measurements of a coating process, as is shown by the Hickman Patent 3,065,466.

In accordance with one embodiment of the present invention, I modify the programming of the two gauges so that the gauging head 24 no longer scans the sheet synchronously with the gauging head 14. On the contrary, the scanning movement of gauge 24 is delayed in time for an interval sufficient for the sheet 10 to move downstream from the location of gauging head 14 to the location of gauging head 24. To this end I have modified a function of programmer 42 by providing a delay counter mechanism 44 and associated odometer type sensing device 46.

Device 46 preferably comprises a simple pulse generator which may include a set of electrical interrupter contacts which are cam operated, for example, by the rotation of a measuring wheel 48 in tractive engagement with the sheet 10. The measuring wheel 48 may consist of a roll or other part of the transport mechanism (not shown) whereby the sheet is transported through the coating mechanism. Otherwise it may comprise a device which is referred to as a "contactor cart" having a pair of wheels, say, one foot in circumference, which ride on the sheet 10 and operate the interrupter contacts to provide an electrical pulse each time a foot of material has passed under the wheels.

These pulses are delivered over a line 50 to the delay counter 44. For a more complete description of the delay counter and odometer system, reference can be made to Patent No. 2,895,888, which described in detail this arrangement as used for a different purpose.

The operation of the system shown in FIG. 1 may now be described. The description may begin by assuming that the programmer 42 delivers a start signal via line 52 to the traversing drive mechanism 20. At the same time that the traversing drive system 20 is energized, the programmer 42 also sends a signal over line 53 which causes the delay counter 44 to start accumulating pulses received from the odometer 46 via line 50.

When the traversing drive mechanism is energized, it drives gauging head 14 across the width of the sheet toward the dotted line position indicated by the numeral 14a. As the gauging head scans across the sheet, a signal from the gauging head is delivered via line 16 to the measuring system 18. The measuring circuits convert the signal obtained from the gauging head to a calibrated voltage which is delivered over line 38 to the averaging computer 34. Said voltage may be proportional to the thickness of the sheet 10 as measured by gauging head 14 or the signal may be indicative of the deviation in the thickness of the sheet from a selected or desired value. During the time that the gauging head 14 is scanning the sheet 10, the averaging computer 34 computes the time integral of the voltage on line 38.

Adjacent to the dotted line indication 14a, there is indicated a position detecting switch mechanism 54. For convenience herein the switching device 54 is indicated physically as an actual switch which is adapted to be struck by the gauging head 14 when it reaches its dotted line position 14a. However, it is understood that the functions of switch 54, as well as other gauging head position detector switches to be described hereinafter, are in fact preferably performed by a positioning bridge circuit and polarized relay system for detecting and controlling the gauge detector head position in a manner similar to that described in Patent No. 2,829,268.

Proceeding with the operating description, when the gauging head 14 arrives at the dotted line position 14a, switch 54 delivers a signal via line 56 to the programmer 42. Programmer 42 in turn causes power to be removed from the traversing drive mechanism 20, stopping the movement of the gauging head 14. At the same time programmer 42 delivers a signal via line 58 to average computer 34 causing the same to cease integrating the signal from measuring circuit 18.

A signal indicating the average value of the base sheet thickness measured by gauging head 14 has now been stored in the average computer 34. Although the particular timing of the event is of no particular importance, either immediately or after a desired delay the programmer 42 will deliver a reversing signal via line 60 to the traversing drive mechanism 20 causing gauging head 14 to return from the dotted line position 14a back to the original position. The arrival of the gauging head at the original position may be indicated by a switch 62 which sends a signal via line 64 to the programmer 42, which in turn de-energizes the traversing drive and allows the gauging head 14 to be stopped at its original position.

In the meantime, or at a later time depending on the length of the transportation delay, the delay counter 44, which was energized at the instant that gauging head 14 began its measuring traverse across the sheet, has been counting unit lengths of the sheet 10 passing under the linear measuring device 46 and 48. When the delay counter 44 has accumulated a number of pulses proportional to the number of unit lengths of material in the machine direction separating gauging heads 14 and 24, the counter 44 will have delivered a signal via line 66 to the programmer 42. On receiving this signal the programmer 42 will in turn have delivered a signal via line 68 to the traversing drive mechanism 30 causing the second gauging head 24 to traverse across the sheet toward the dotted line position 24a.

Now if the scanning speed or traversing speed of the gauge head 24 is the same as the traversing speed of gauge 14 relative to the rate of travel of sheet 10 through the coater, the gauge head 24 will scan across the same portions of material that were inspected by gauging head 14. A signal indicative of the instantaneous sheet thickness measured by gauge 24 will be delivered via line 28 to the measuring system 26, which in turn will provide a derived signal over line 40 to the averaging computer 36. Computer 36 will therefore compute the time integral of the signal received from the measuring circuit 26.

This integral computation will proceed while gauging head 24 traverses to its dotted line position 24a. The arrival of this gauging head at the dotted line position will be signaled by a switch 70 which sends a signal to programmer 42 via line 72. At this instant programmer 42 will de-energize the traversing drive mechanism 30 and will also deliver a signal via line 74 to average computer 36 causing this unit to cease averaging the measurement signal received from circuit 26.

At this time the averaging computer 36 will have stored a signal indicating the average value of the coated sheet thickness measurements obtained from gauging head 24. Programmer 42 will now deliver via lines 76 and 78 respectively signals to both averaging computers 34 and 36. These readout signals cause the averaging computers to deliver, to a difference computer 80, signals on lines 82 and 84 respectively which indicate the averages of the coated sheet and uncoated sheet measurements. Programmer 42 will also deliver via line 86 a reversing signal to the traversing drive mechanism 30, causing the gauging head 24 to return to the starting position. While gauging head 24 is returning to the starting position, difference computer 80 will deliver via line 88 a constant output signal indicating the difference between the coated and uncoated sheet average measurements. This signal is fed to a conventional recorder 90. The diffference signal may also be delivered to a suitable automatic controlling device 92 such as that which is described in Patent No. 2,895,888 cited above, which utilizes the coating weight signal to automatically control the coating machine 12. The control connections are indicated by line 94.

At a convenient time while the gauging head 24 is returning to the starting position, the programmer will deliver a signal via line 96 to delay counter 44 for resetting the same to zero. After the output signal from the difference computer 80 has been applied to the recorder 90 and controller 92 for a sufficient length of time to be registered therein and utilized thereby, programmer 42 will deliver signals via lines 98 and 100 to the average computers 34 and 36 for resetting the integrator circuits therein to zero.

As soon as the gauging head 24 has returned across the sheet, its arrival at the starting point is signaled by the operation of a switching device indicated by the numeral 102. This signal is delivered via line 103, and causes the programmer 42 to de-energize the traversing drive mechanism 30. Thereupon the programmer 42 again delivers a signal via line 52 to traversing drive mechanism 20, to begin another sequence of operation as heretofore described.

Referring now to FIG. 2, there is shown one form of preferred circuitry which may be utilized in a portion of the apparatus of FIG. 1, and whereby the two averaging computer functions and the difference computation function may all be performed by a conventional operational integrator circuit utilizing a capacitor as a storage device.

Here the numeral 110 generally indicates a gauge comprising in general the gauging head 14 and measuring circuit 18 of FIG. 1. As is described for example in Patent No. 2,790,945, the gauge utilizes a suitable servo 112 which is employed in a null-balance feedback system to drive the indicator 116 of a recorder (not shown) having an associated scale 118 for reading out the measurements provided by the gauge. As is indicated by the dotted line 114, the servomechanism may also be used to drive a repeat slidewire potentiometer 120. The operation of the measuring servo 112 causes the movable tap 120a of potentiometer 120 to be driven to a position which indicates the thickness of the base sheet 10.

The slidewire potentiometer 120, in series with a dropping resistor 122, constitutes one arm of a bridge circuit 126 having another potentiometer 124 forming the other arm thereof. A voltage source represented by a battery 128 is connected across this bridge circuit in series with a rheostat 130 whereby the bridge circuit may be energized by a voltage of variable amplitude. Potentiometer 124 has a variable tap 124a with a ground connection. The bridge circuit 126 is of a type which is commonly used in servo-rebalancing instruments and is adapted to function as a variable voltage source having a calibrated output voltage dependent on the position of the pointer 116 relative to scale 118.

In the illustrative circuit shown, the value of the dropping resistor 122 and the setting of the variable tap 124a are such that the bridge is balanced and provides no output voltage when the pointer 116 is located at the left end 118a of the scale 118. When the pointer is located at the right end 118b of the scale, potentiometer tap 120a moves to the right end of the potentiometer and the bridge circuit provides maximum voltage having an arbitrarily selected value taken with reference to the grounded potentiometer tap 124a.

The above described apparatus in FIG. 2 is essentially duplicated by the second gauge 132, which generally represents the combination of gauging head 24 and measuring system 26 of FIG. 1. Gauge 132 has an associated servo 134, which drives a recorder (not shown) including a pointer 136 which is movable relative to a calibrated scale 138. Mechanically connected to the servo and pointer assembly is the variable tap 140 of a potentiometer which is connected in a bridge circuit 142 identical with the bridge circuit 126, except that the polarity of the voltage 144 which energizes the bridge circuit 142 is reversed relative to the voltage source 128 in bridge circuit 126.

The component values in bridge 142 are selected and the adjustment of the circuit is such that the output from the bridge circuit is zero when the measuring pointer 136 is in line with the left end mark 138a of scale 138, and so that when pointer 136 is in line with right end mark 138b of scale 138 the bridge circuit 142 delivers a voltage having the same magnitude as the voltage delivered by bridge circuit 126 when the pointer 116 is in line with the right end mark 118b of scale 118. As has been noted, the voltages from the bridge circuits 126 and 142, however, have opposite polarity.

Proper adjustment of the two bridge circuits may be determined by connecting a voltmeter between tap 120a in bridge circuit 126 and tap 140 in bridge circuit 142. The potential between these two points should be zero whenever the two pointers 116 and 136 are located at the same point on their respective scales, regardless of the location of said point.

The variable tap 120a in bridge circuit 126 is adapted to be selectively connected through a switch or set of relay contacts 146 and a summing resistor 148 to the input 150 of an operational amplifier 152. In the same manner the variable tap 140 is adapted to be connected through a switch or set of relay contacts 154 and a summing resistor 156 to the input 150 of the amplifier. Amplifier 152 is a conventional operational amplifier having a practically infinite forward gain and a feedback capacitor 158 connecting the input 150 and the output 160 thereof. A switch or set of relay contacts 162 is adapted when the contacts are closed to connect a shunt resistor 164 across the capacitor 158. A further switch or set of relay contacts 166 is adapted to selectively connect the output 160 of the amplifier to a readout device 168, which may represent either the recorder 90 of FIG. 1, the automatic control device 92, or both. As is indicated by the respective dotted lines, the switch or relay contacts 146, 154, 162, and 166 are operated by the program switching device 42 of FIG. 1.

Recalling the description of the operation of the system of FIG. 1, the operation of the FIG. 2 circuits is as follows. When the gauging head 14 starts scanning the base sheet 10, programmer 42 closes switch 146. Servo 112 continuously drives the pointer 116 to a position indicating the instantaneous thickness of the base sheet 10. The voltage appearing at potentiometer tap 120a, constituting a voltage analog of the base sheet thickness variations, is applied through summing resistor 148 to the input 150 of amplifier 152. The amplifier provides an output voltage which is fed back through capacitor 158 to maintain the amplifier input 150 at zero or ground potential. As is well known, the voltage across the capacitor 158 is proportional to the time integral of the voltage from the potentiometer tap 120a. The computation of this integral proceeds as gauge 14 moves across the sheet until the delay counter 44 (FIG. 1) "counts out" and delivers its signal to the programmer 42, indicating that the transportation lag time has expired. At this time gauging head 24 starts to scan across the sheet, and programmer 42 closes switch 154, connecting the variable tap 140 in bridge circuit 42 through summing resistor 156 to the amplifier input 150. The servo 134 continuously drives the indicator 136 to a point on scale 138 which indicates the instantaneous thickness of the coated sheet 10a. The servo also drives variable potentiometer tap 140, whereby the bridge circuit 142 delivers a voltage which is variable with the thickness of the coated sheet.

Recalling that the feedback amplifier maintains the input junction point 150 at zero potential, that the potential at potentiometer tap 120a is zero or positive, and further recalling that the potential at the variable tap 140 is zero or negative, it is apparent that a positive current directly proportional to the voltage on tap 120a flows through resistor 148 into the junction point 150. A current directly proportional to the negative voltage at tap 140 flows out of the junction point 150 through resistor 156. It is also apparent that the feedback capacitor 158 assumes an electrical charge. This charge will be proportional to the difference, between the product of the current flow through resistor 148 and the time the current flows, and the product of the current through resistor 156 and the time that this current flows.

Alternately it may be stated that a charge is placed on capacitor 158 which is proportional to the average value of the voltage at the tap 150a and also proportional to the length of time that the switch 146 is closed. The amount of charge removed from capacitor 158 is proportional to the average value of the voltage at tap 140 and also proportional to the length of time that switch 154 is closed. Since both switches are closed for the same period of time, that is, the time required for the gauges to scan at the same speed across the same width of the sheet, the net charge remaining on capacitor 158 is directly proportional to the difference between the time integral of the voltage at tap 120a and the time integral of the voltage at tap 140, assuming that the two summing resistors 148 and 156 have identical resistance values. The same result could of course be obtained with different resistor values by properly adjusting the outputs of the bridge circuits 126 and 142.

At the end of the integrating period, the output terminal 160 will have a potential directly proportional to the charge remaining on capacitor 158.

Recalling the description of the operation of the apparatus of FIG. 1, switch 146 (FIG. 2) is opened when the gauging head 14 has completed its traverse across the base sheet 10. The switch 154 is opened when the gauging head 24 has completed its traverse across the coated sheet 10a. The voltage at the amplifier output 160 then represents the difference between the time integral of the base sheet thickness measurement and the time integral of the coated sheet thickness measurement. Programmer 42 now closes switch 166 connecting the amplifier output voltage to the readout device 168. It is understood that the readout device is calibrated in accordance with a suitable scale factor representing the period of time during which each of the switches 146 and 154 is closed. This time period is of course the particular traversing time required for each of the gauges to scan across the width of the sheet. Accordingly the indication provided by the readout device 168 is proportional to the average thickness of the coating which has been applied to the base sheet. After a sufficient length of time provided to allow the output voltage from the difference integrator to be properly registered and utilized by the readout device 168, programmer 42 closes switch 162, connecting the resistor 164 across the feedback capacitor 158. This discharges the capacitor and resets the integrator to zero, whereupon it is ready to repeat the computation process on the next scan of the gauges.

Referring to FIG. 3, there is shown an industrial measuring system in which the present invention is embodied in a modification of a well-known synchronous scanning arrangement of gauges for providing a measure of the thickness of the coating applied to a moving sheet. For a background description of one prior art arrangement which may be so modified, reference can be made to an article entitled "Computers Team With Nuclear Gauges to Control a Paper Saturating Process" appearing in the December 1955 issue of Control Engineering.

In FIG. 3 a pair of scanning gauges 200 and 202 are associated respectively with a pair of profile averaging computers 204 and 206. The traversing functions of the two gauges are controlled by a program control unit 42a similar to that described in more detail in connection with FIG. 1. Program control unit 42a also controls the integrating, readout and reset functions of the profile averaging computers in a similar manner.

In accordance with this invention, a delay unit 44a similar to the delay counter 44 of FIG. 1 cooperates with the program control unit 42a to delay the scanning operation of gauge 202 and the associated functions of the averaging computer 206.

The numeral 210 indicatecs a conventional two-pen recorder of the strip chart variety. The recorder 210 in this illustrative embodiment is arranged so that either the instantaneous or running variations in the sheet may be recorded in the manner shown by the wriggly traces 212, or the average measurements may be read out in the form of a straight vertical line as at 214. The average recording function of the recorder 210 is utilized according to the invention to provide a very simple difference computer arrangement. Therefore the continuous thickness recording function which generates the wriggly traces as at 212 is not particularly pertinent or necessary to the practice of the present invention, but it is chosen to illustrate one type of readout sequencing operation which helps to explain the operation of the present invention.

On the recorder 210, a first indicating pointer 216 is associated with the gauge 200 and the profile averaging computer 204. The pointer 218 is associated with gauge 202 and the profile averaging computer 206. Recorder 210 actually constitutes two separate recording instruments in one unit, which employs a common chart drive mechanism and a common strip chart which moves at a constant rate in the direction of the arrow 220. A recorder input line 222 receives the signal which controls the movement of pointer 216 and similarly an input line 224 receives the signal which controls the pointer 218. By means of a switch 226, which is automatically operated by the program control unit 42a, the input line 222 is connected to the gauge output when the switch is in position A whereby a wriggly trace as at 212 will indicate the instantaneous variations in the thickness of sheet 10 going into the coater 12. When the switch 226 is in position B the recorder input 222 is connected to the profile averaging computer output whereby the straight vertical trace 214 records the average thickness of the sheet as computed by the computer 204. A similar operation of the recorder servomechanism which actuates pointer 218 is obtained by the provision of the automatically controlled switch 228, which connects recorder input 224 alternately to the output of gauge 202 or profile average computer 206.

The pointer 216 is connected as shown by a dotted line 230 to the variable tap 232a of a potentiometer 232. Similarly the pointer 218 is connected as indicated by dotted line 234 to the variable tap 236a of a potentiometer 236. These two potentiometers are connected to form a bridge circuit 238 which is energized by a voltage source represented by the battery 240. The potential at the tap 232a constitutes an electrical analog of the position of the pointer 216. The potential at the tap 236a constitutes an electrical analog of the position of pointer 218. The potential difference between taps 232a and 236a constitutes the output voltage from the bridge circuit 238 which is proportional to the difference between the positions of the two pointers. The readout device 168 may be selectively connected to the bridge output voltage by means of a switch 242 which is automatically operated by the program control unit 42a. The operating connection is indicated by the dotted line 244.

The operation of the FIG. 3 apparatus may be briefly described as follows. Gauge 200 moves across the width of the sheet 10 with switch 226 in position A, and the wriggly trace 212 indicates the variation in the thickness of the base sheet as the gauges move from one side to the other. This trace is produced by a recorder pen (not shown) associated with pointer 216. The recording of the profile trace occurs during a time period represented by the vertical distance $P_1$ on the recorder chart.

After a delay time determined by delay unit 44a, gauge 202 starts scanning across the coated sheet 10a and generates the coated sheet profile trace during a time period represented by $P_2$. While the profile traces are being recorded, the average computers 204 and 206 are integrating the sheet thickness. When gauge 200 completes its scan across the sheet, program control unit 42a places switch 226 in position B, connecting recorder input line 222 to the output of profile averaging computer 204. The recorder now registers the vertical line 214. In a similar matter when gauge 202 completes its scan across the sheet, the program control unit 42a places switch 228 in position B and the other recorder pen draws the vertical trace 246. The sequencing of the two computer cycles provides overlapping average readout intervals $A_1$ and $A_2$. During the overlap of these readout intervals there is provided a difference readout interval R. During interval R, switch 242 is actuated by the program control unit 42a to connect the readout device 168 to the output voltage across the bridge circuit 238. Hence the readout device receives a voltage directly proportional to the horizontal distance between the two vertical lines 214 and 246 on the 210 recorder, and this distance is proportional to the thickness of the coating which has been applied to the base sheet 10.

The foregoing description illustrates the application of the present invention to a sheet coating process only. However the system has obvious applications to many other industrial processes wherein a material having a first variable characteristic is passed through means for imparting to the material a second variable characteristic. Similarly, the invention has been shown and described as being embodied in specific apparatus, but such showing and description is meant to be illustrative only and not restrictive, since obviously many changes, modifications, and outwardly quite different structures can be made without departing from the spirit and scope of the invention as is set forth in the appended claims.

What is claimed is:

1. In combination with apparatus wherein a base material having a first variable characteristic is passed through a process for imparting to the material a second variable characteristic to form a modified material, a first means gauging said base material for providing a first signal that is variable with said first characteristic, a second means gauging said modified material for providing a second signal that is variable with both said first and second characteristics, means for generating a mathematical integral of said first signal computed over a first time period, means for generating a mathematical integral of said second signal computed over a second time period, means controlling the operation of said integral generating means in a time sequence whereby the beginning of said second time period follows the beginning of said first time period after a time interval equal to the delay between said gauging of said base material and said gauging of said modified material, and means for mathematically combining said generated integrals of said first and second signals to provide an output signal indicating a function of said second characteristic that is corrected for variations in said first characteristic.

2. Apparatus as in claim 1 wherein said gauging means include means rendering said characteristic-variable signals in the form of electrical voltages having opposite polarities, and including a capacitor common to both of said integrating means, said capacitor being charged by a current proportional to one of said voltages during one of said time periods and discharged by a current proportional to the other of said voltages during the other of said time periods.

3. Apparatus as in claim 1 wherein said means for generating said mathematical integral of said first signal comprises a first average computer for generating a first integrated signal indicative of the average value of said first signal, wherein said means for generating said mathematical integral of said second signal comprises a second average computer for generating a second integrated signal indicative of the average value of said second signal, wherein said first average computer is adapted to store said first integrated signal until the end of said second time period, and wherein said integral combining means includes means for comparing said stored first integrated signal with said second integrated signal to provide said output signal.

4. Apparatus as in claim 1 wherein said means for generating said mathematical integral of said first signal comprises a first average computer for generating a first integrated signal indicative of the average value of said first signal, wherein said means for generating said mathematical integral of said second signal comprises a second average computer for generating a second integrated signal indicative of the average value of said second signal, wherein said first average computer is adapted to store said first integrated signal, wherein said second average computer is adapted to store said integrated signal, and wherein said integral combining means includes means for obtaining the difference between said stored first integrated signal with said stored second integrated signal to provide said output signal.

5. In combination with apparatus wherein a base material having a first variable characteristic is transported through a process for imparting to the material a second variable characteristic to form a modified material, a first means gauging said base material for providing a first signal that is variable with said first characteristic, a second means gauging said modified material for providing a second signal that is variable with both said first and second characteristics, means for generating a mathematical integral of said first signal computed over a first time period means for generating a mathematical integral of said second signal computed over a second time period, means including means responsive to the rate at which said material is transported through said process for controlling the operation of said integral generating means in a time sequence whereby the beginning of said second time period follows the beginning of said first time period after a time interval equal to the delay between said gauging of said base material and said gauging of said modified material, and means for mathematically combining said generated integrals of said first and second signals to provide an output signal indicating a function of said second characteristic that is corrected for variations in said first characteristic.

6. In combination with apparatus wherein a base sheet having a first variable characteristic is passed through a process for imparting to the sheet a second variable characteristic to form a modified sheet, a first means gauging said base sheet for providing a first signal that is variable with said first characteristic, a second means gauging said modified sheet for providing a second signal that is variable with both said first and second characteristics, each of said gauging means including a gauging head responsive to the respective material characteristics and means causing said gauging head to scan across the width of said sheet, means for generating a mathematical integral of said first signal computed over a first time period wherein said gauging head for said first gauging means scans said base sheet, means for generating a mathematical integral of said second signal computed over a second time period wherein said gauging head for said second gauging means scans said modified sheet, means controlling the operation of said gauging head scanning means and said integral generating means in a time sequence whereby the beginning of said second time period follows the beginning of said first time period after a time interval equal to the delay between said gauging of said base sheet and said gauging of said modified sheet, and means for mathematically combining said generated integrals of said first and second signals to provide an output signal indicating a function of said second characteristic that is corrected for variations in said first characteristic.

7. Apparatus as in claim 6 wherein said gauging means include means rendering said characteristic-variable signals in the form of electrical voltages having opposite polarities, and including a capacitor common to both of said integrating means, said capacitor being charged by a current proportional to one of said voltages during one of said time periods and discharged by a current proportional to the other of said voltages during the other of said time periods.

8. Apparatus as in claim 6 wherein said means for generating said mathematical integral of said first signal comprises a first average computer for generating a first integrated signal indicative of the average value of said first signal, wherein said means for generating said mathematical integral of said second signal comprises a second average computer for generating a second integrated signal indicative of the average value of said second signal, wherein said first average computer is adapted to store said first integrated signal until the end of said second time period, and wherein said integral combining means includes means for comparing said stored first integrated signal with said second integrated signal to provide said output signal.

9. Apparatus as in claim 6 wherein said means for generating said mathematical integral of said first signal comprises a first average computer for generating a first integrated signal indicative of the average value of said first signal, wherein said means for generating said mathematical integral of said second signal comprises a second average computer for generating a second integrated signal indicative of the average value of said second signal, wherein said first average computer is adapted to store said first integrated signal, wherein said second average computer is adapted to store said second integrated signal, and wherein said integral combining means includes means for obtaining the difference between said stored first integrated signal with said stored second integrated signal to provide said output signal.

10. In combination with apparatus wherein a base sheet having a first variable characteristic is transported through a process for imparting to the sheet a second variable characteristic to form a modified sheet, a first means gauging said base sheet for providing a first signal that is variable with said first characteristic, a second means gauging said modified sheet for providing a second signal that is variable with both said first and second characteristics, each of said gauging means including a gauging head responsive to the respective material characteristics and means causing said gauging head to scan across the width of said sheet, means for generating a mathematical integral of said first signal computed over a first time period wherein said gauging head for said first gauging means scans said base sheet, means for generating a mathematical integral of said second signal computed over a second time period wherein said gauging head for said second gauging means scans said modified sheet, means including means responsive to the rate at which said material is transported through said process for controlling the operation of said gauging head scanning means and said integral generating means in a time sequence whereby the beginning of said second time period follows the beginning of said first time period after a time interval equal to the delay between said gauging of said base sheet and said gauging of said modified sheet, and means for mathematically combining said generated integrals of said first and second signals to provide an output signal indicating a function of said second characteristic that is corrected for variations in first characteristic.

11. In combination with apparatus wherein a base sheet having a first variable characteristic is transported through a process for imparting to the sheet a second variable characteristic to form a modified sheet, a first gauging means adapted on receipt of a first start signal for scanning said base sheet to provide a first analog signal that is variable with said first characteristic, a second gauging means adapted on receipt of a second start signal for scanning said modified material to provide a second analog signal that is variable with both said first and second characteristics, means for generating a mathematical integral of said first analog signal while said first gauging means scans said base sheet, means for generating a mathematical integral of said second signal while said second gauge scans said modified sheet, programmer means for controlling the operation of said integral generating means and for providing said first and second start signals to said gauging means in sequence, odometer means energized by said programmer on delivery of said first start signal and responsive to the movement of said sheet through said process for delaying said second start signal provided by said programmer for the time required for a portion of said sheet to pass from said first gauging means to said second gauging means, and means for mathematically combining said generated integrals of said first and second analog signals to provide an output signal indicating a function of said second characteristic that is corrected for variations in said first characteristic.

12. In combination with apparatus wherein a base material having a first variable characteristic is passed through a process for imparting to the material a second variable characteristic to form a modified material, a first means gauging said base material for providing a first signal that is variable with said first characteristic, a a second means gauging said modified material for providing a second signal that is variable with both said first and second characteristics, means for generating a mathematical integral of said first signal computed over a first time period and for generating a mathematical integral of said second signal computed over a second time period, means controlling the operation of said integral generating means in a time sequence whereby the beginning of said second time period follows the beginning of said first time period after a time interval equal to the delay between said gauging of said base material and said gauging of said modified material, and means for mathematically combining said generated integrals of said first and second signals to provide an output signal indicating a function of said second characteristic that is corrected for variations in said first characteristic.

13. In combination with apparatus wherein a base sheet having a first variable characteristic is passed through a process for imparting to the sheet a second variable characteristic to form a modified sheet, a first means gauging said base sheet for providing a first signal that is variable with said first characteristic, a second means gauging said modified sheet for providing a second signal that is variable with both said first and second characteristics, each of said gauging means including a gauging head responsive to the respective material characteristics and means causing said gauging head to scan across the width of said sheet, means for generating a mathematical integral of said first signal computed over a first time period wherein said gauging head for said first gauging means scans said base sheet, and for generating a mathematical integral of said second signal computed over a second time period wherein said gauging head for said second gauging means scans said modified sheet, means controlling the operation of said gauging head scanning means and said integral generating means in a time sequence whereby the beginning of said second time period follows the beginnning of said second time period follows the beginning of said first time period after a time interval equal to the delay between said gauging of said base sheet and said gauging of said modified sheet, and means for mathematically combining said generated integrals of said first and second signals to provide an output signal indicating a function of said second characteristic that is corrected for variations in said first characteristic.

References Cited

UNITED STATES PATENTS

| | | | |
|---|---|---|---|
| 2,964,633 | 12/1960 | Bernstein | 324—71 |
| 3,000,438 | 9/1961 | Alexander | 250—83.3 |
| 3,007,052 | 10/1961 | Hickman et al. | 250—83.3 |
| 3,015,129 | 1/1962 | Hays et al. | 235—151.1 |
| 3,067,939 | 12/1962 | Ziffer | 235—193 |
| 3,190,261 | 6/1965 | Ziffer | 250—83.3 |

MALCOLM A. MORRISON, *Primary Examiner.*

I. KESCHNER, *Assistant Examiner.*